(No Model.)

M. D. RUCKER.
BICYCLE.

No. 322,974.                                    Patented July 28, 1885.

WITNESSES
Edward C. Hammond
John Phillips

INVENTOR
Martin Diederich Rucker
per Robt. Ed. Phillips.
Atty.

UNITED STATES PATENT OFFICE.

MARTIN DIEDERICH RUCKER, OF LONDON, ENGLAND.

BICYCLE.

SPECIFICATION forming part of Letters Patent No. 322,974, dated July 28, 1885.

Application filed April 14, 1885. (No model.) Patented in England May 9, 1884, No. 7,473.

*To all whom it may concern:*

Be it known that I, MARTIN DIEDERICH RUCKER, a subject of the Queen of Great Britain, residing in London, England, have invented certain new and useful Improvements in Bicycles to Carry two Riders, known as "Tandem" Bicycles, of which the following is a specification.

The object of my invention is the construction of a bicycle to carry two riders, who may both assist in the propulsion of the machine.

To this end it consists in taking an ordinary type of bicycle, with a small driving-wheel mounted in a suitable forked frame, which is connected by a head to a trailing backbone carrying a small rear wheel and a seat or saddle for one of the riders. The fork carrying the driving-wheel is raked backward and has attached immediately in front of the head another seat or saddle mounted on a suitable spring, and a handle-bar for the front rider. The ends of the fork carrying the driving-wheel are extended below the center of the axle in the shape of an inverted Y. On the ends of these prongs are mounted in suitable bearings short pedal-axles, each carrying a chain-wheel and a crank, the latter of which are each provided with suitable pedals. The former are each connected to chain-wheels fixed to the driving-wheel or its axle by endless chains, there being a pair of chains on each side of the wheel, so that the power applied to each pedal-axle is transmitted direct to the driving-wheel.

Instead of using a pair of chains on each side, I sometimes use but one chain, passing it round a chain-wheel fixed to each of the three axles. By this arrangement I dispense with one chain-wheel on each side of the driving-wheel.

On each side of the fork carrying the driving-wheel are mounted, so as to be adjustable in height, two pillars, on which are mounted a suitable spring and saddle or seat, and from each pillar is carried a handle-bar for the use of the front rider. The handles are curved round from behind the front rider, so that he has an open front in case of a "spill."

It will be seen that as the seat and handles for the use of the front rider are mounted on the frame carrying the driving-wheel he has no control over the steering, which is entirely in the hands of the rear rider.

The machine may be easily converted into a single one, to carry one rider only, by removing the seat, handles, pedal-axles, and chains used by the front rider.

Figure 1:
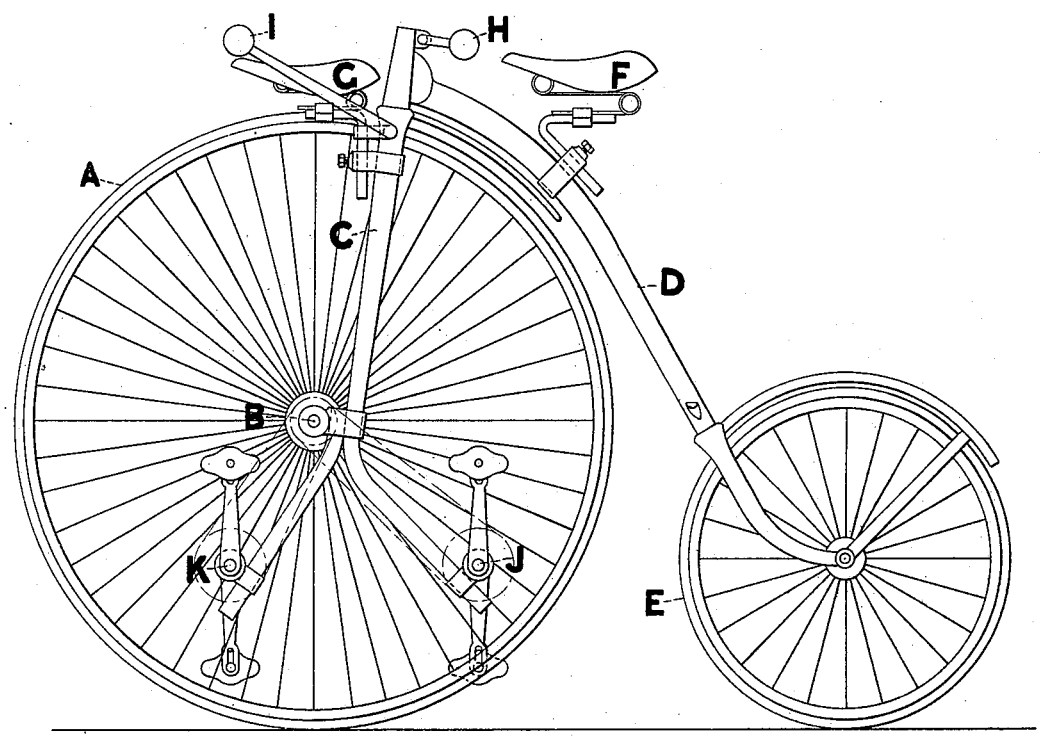
Figure 2:
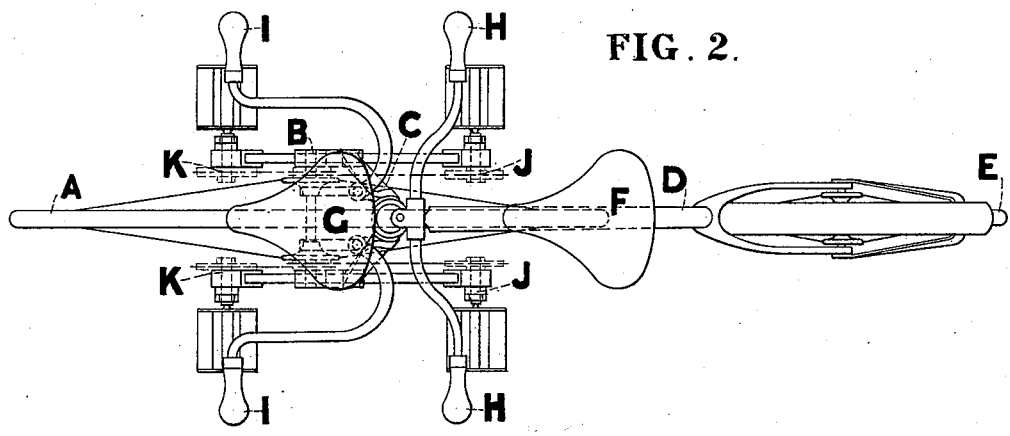

In the accompanying drawings, Figure 1 is a side elevation, and Fig. 2 a plan, of my tandem bicycle.

Similar letters refer to similar parts throughout the views.

Referring to the figures, A designates the driving-wheel; B, the axle thereof; C, the fork-frame in which the driving-wheel is mounted; D, the backbone carrying the small wheel E; F, the seat for the rear rider, and G that for the front rider; H, the handles by which the machine is steered; I, the handles for the front rider; J, the pedal-axles for the rear rider; K, those for the front rider.

The driving-wheel may be geared up or down by varying the sizes of the chain-wheels on the pedal-axles in relation to those on the axle of the driving-wheel. The bearings of the pedal-axles are adjustable on the pronged fork ends, so as to provide a ready means of taking up the slack of the chains.

I am aware that bicycles have already been constructed to carry two riders, in which each rider drives and steers an independent wheel, and therefore I do not claim such a machine, broadly; but What I do claim as my invention, and desire to secure by Letters Patent, is—

1. In a bicycle, the combination of two spring-seats attached to the frame over the driving and steering wheel, duplex pedal-cranks having axles journaled in bearings also clamped to the frame, and the mechanism connecting the crank-axles with the axle of the steering-wheel, substantially as and for the purpose set forth.

2. In a bicycle, the combination of two spring-seats attached to the frame over the driving and steering wheel, duplex pedal-cranks having axles journaled in bearings also clamped to the frame, handles for the convenience of the front rider, a handle-bar for steering, and the mechanism connecting the crank-axles with the axle of the steering-wheel, substantially as and for the purpose set forth.

3. In a bicycle, the combination of a driving-wheel, a fork-frame, a handle-bar for guiding the driving-wheel, a backbone pivoted in the head of the fork-frame and provided with a small rear wheel, a spring-seat clamped to the backbone, a spring-seat clamped to the fork-frame, duplex pedal-cranks having axles journaled in bearings also clamped to the fork-frame, and chain-wheels and chains for connecting the crank-axles with the axle of the driving and steering wheel, substantially as and for the purpose set forth.

4. In a bicycle, the combination of driving-wheel A, having axle B, the fork-frame C, the handles H, for guiding the said driving-wheel, the backbone D, provided with small rear wheel, E, the spring-seats F and G, the handles I, for the convenience of the front rider, the duplex pedal-cranks having axles J and K, the chain-wheels secured to the said axles B, J, and K, and the chain for communicating the rotary motion, substantially as and for the purpose set forth.

In witness whereof I have hereunto signed my name in the presence of two subscribing witnesses.

MARTIN DIEDERICH RUCKER.

Witnesses:
G. D. N. FORD,
ROBT. ED. PHILLIPS.